(12) United States Patent
Irie et al.

(10) Patent No.: US 6,957,597 B2
(45) Date of Patent: Oct. 25, 2005

(54) ADJUSTING APPARATUS FOR A BICYCLE BRAKE CONTROL DEVICE

(75) Inventors: Yoshinori Irie, Osakasayama (JP); Hiroaki Shiraishi, Izumi (JP); Satoshi Shahana, Osaka (JP)

(73) Assignee: Shimano, Inc., Sakai (JP)

(*) Notice: Subject to any disclaimer, the term of this patent is extended or adjusted under 35 U.S.C. 154(b) by 233 days.

(21) Appl. No.: 10/378,418

(22) Filed: Feb. 28, 2003

(65) Prior Publication Data
US 2003/0167871 A1   Sep. 11, 2003

(30) Foreign Application Priority Data
Mar. 7, 2002 (JP) .............................. 2002-062403

(51) Int. Cl.[7] ............................ F16C 1/10; G05G 11/00
(52) U.S. Cl. .................................... 74/502.2
(58) Field of Search ........................... 74/501.6, 502.2, 74/501.5 R, 473.3, 489, 523, 525; 192/35, 192/217

(56) References Cited

U.S. PATENT DOCUMENTS

| | | | |
|---|---|---|---|
| 4,100,820 A | 7/1978 | Evett | |
| 5,241,878 A | 9/1993 | Nagano | |
| 5,400,675 A | 3/1995 | Nagano | |
| 6,457,378 B2 * | 10/2002 | Hatakoshi et al. | ............ 74/525 |
| 6,516,682 B2 * | 2/2003 | Brainard | .................... 74/502.2 |

FOREIGN PATENT DOCUMENTS

| | | |
|---|---|---|
| DE | 2434300 | 1/1976 |
| EP | 764574 A1 | 3/1997 |
| GB | 856796 | 12/1960 |
| JP | 11-235992 A | 8/1999 |

* cited by examiner

Primary Examiner—Chong H. Kim
(74) Attorney, Agent, or Firm—James A. Deland

(57) ABSTRACT

An adjusting apparatus for a bicycle brake control device comprises a brake control member bracket adapted to be mounted to a handlebar and a brake control member movably mounted to the brake control member bracket such that it can move from a brake release position toward a brake operating position. An adjustment member is disposed between the brake control member bracket and the brake control member to adjust an orientation of the brake control member relative to the brake control member bracket when the brake control member is in the brake release position.

29 Claims, 7 Drawing Sheets

ADJUSTING APPARATUS FOR A BICYCLE BRAKE CONTROL DEVICE

BACKGROUND OF THE INVENTION

The present invention is directed to bicycles and, more particularly, to various features of a bicycle braking apparatus.

Brake control devices that operate brake mechanisms usually are mounted to the handlebar of a bicycle. A brake control device usually comprises a mounting bracket that is mounted to the handlebar and a lever member that is movably mounted to the mounting bracket. The lever member is mounted such that it can move from a brake release position toward the handlebar. Unless they are opposite levers, lever members are disposed such that, irrespective of the handlebar configuration, the tips thereof open toward the ends of the handlebar. The lever member is connected to the brake mechanism via a brake wire or a hydraulic apparatus, and normally pressure is constantly applied to the lever member in the direction of the brake release position. The rider applies the brake by grasping the tip of the lever member using his or her fingers and pulling the lever member toward the handlebar, and disengages the brake by relaxing the force on the lever member and letting it return toward the brake release position.

Normally, the torque applied to the lever member increases as the point at which pressure is applied to the lever member moves away from the axis of movement. Such increased torque makes it easy to operate the brake mechanism with a small amount of force. With a conventional lever member described above, the brake release position often is set at a specific position in accordance with the size of the average hand. As a result, when the rider's hand is small, the tip of the lever member can be located too far from the handlebar for the rider to reach easily. As a result, the lever member must be grasped at a point closer to the axis of movement, i.e., at a point on the lever member that is closer to the handlebar than the tip of the lever, thus decreasing the amount of torque applied to the lever member for a given amount of force. Thus, a rider with relatively small hands must exert even more force to operate the brake mechanism than a typical rider with average-sized hands.

It has been proposed to move the brake release position of the lever member closer to the handlebar by mounting an adjustment member between the mounting bracket and the lever member. However, if it is sought to move the brake release position closer to the handlebar via an adjustment member, the adjustment member mounting operation must be performed easily and reliably, with a minimum of inconvenience.

SUMMARY OF THE INVENTION

The present invention is directed to various features of a bicycle braking apparatus. In one embodiment, an adjusting apparatus for a bicycle brake control device comprises a brake control member bracket adapted to be mounted to a handlebar and a brake control member movably mounted to the brake control member bracket such that it can move from a brake release position toward a brake operating position. An adjustment member is disposed between the brake control member bracket and the brake control member to adjust an orientation of the brake control member relative to the brake control member bracket when the brake control member is in the brake release position. Additional inventive features will become apparent from the description below, and such features may be combined with the above features to provide additional benefits.

DETAILED DESCRIPTION OF THE EMBODIMENTS

Figure 1:
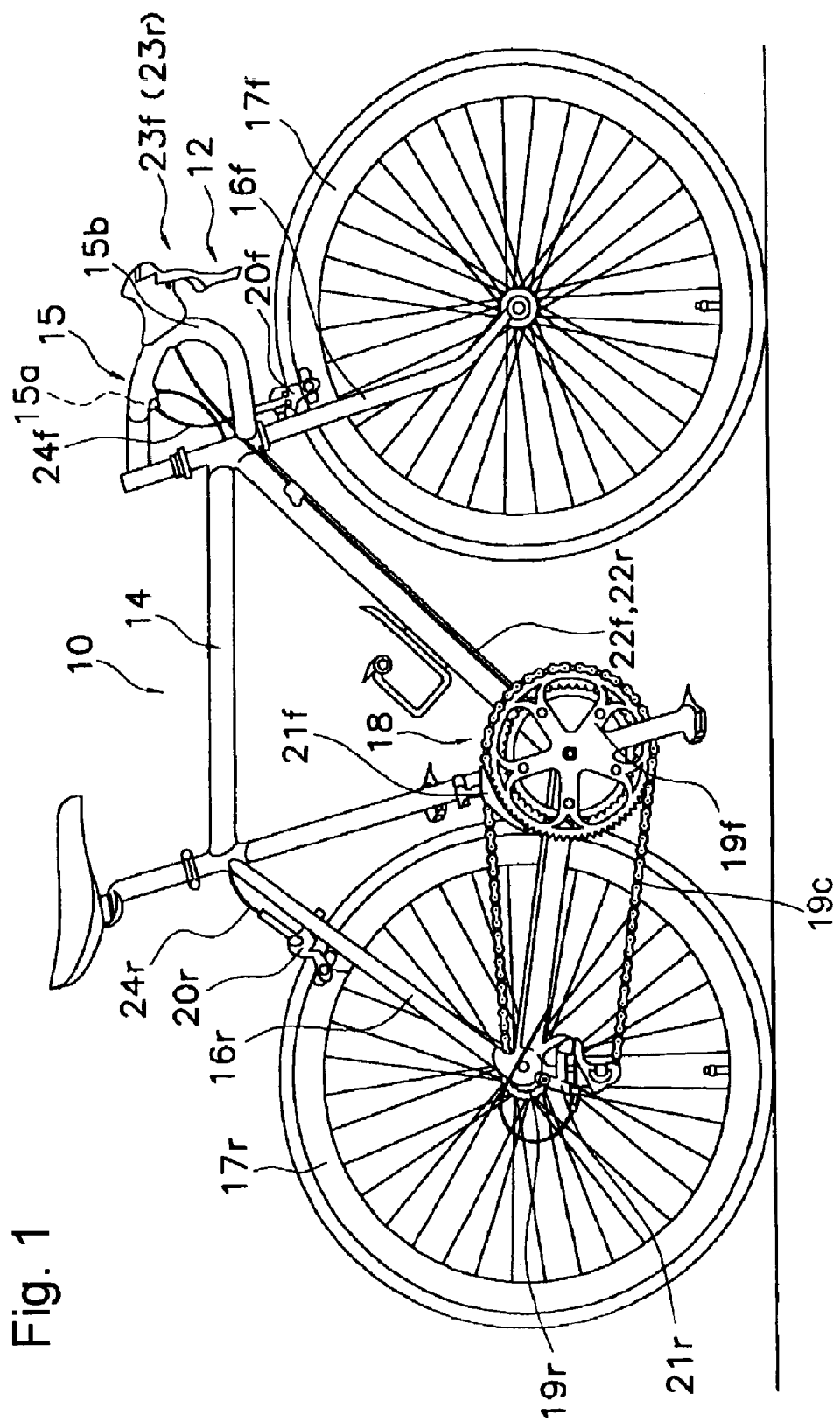
FIG. 1 is a side view of a particular embodiment of a bicycle.
Figure 2:
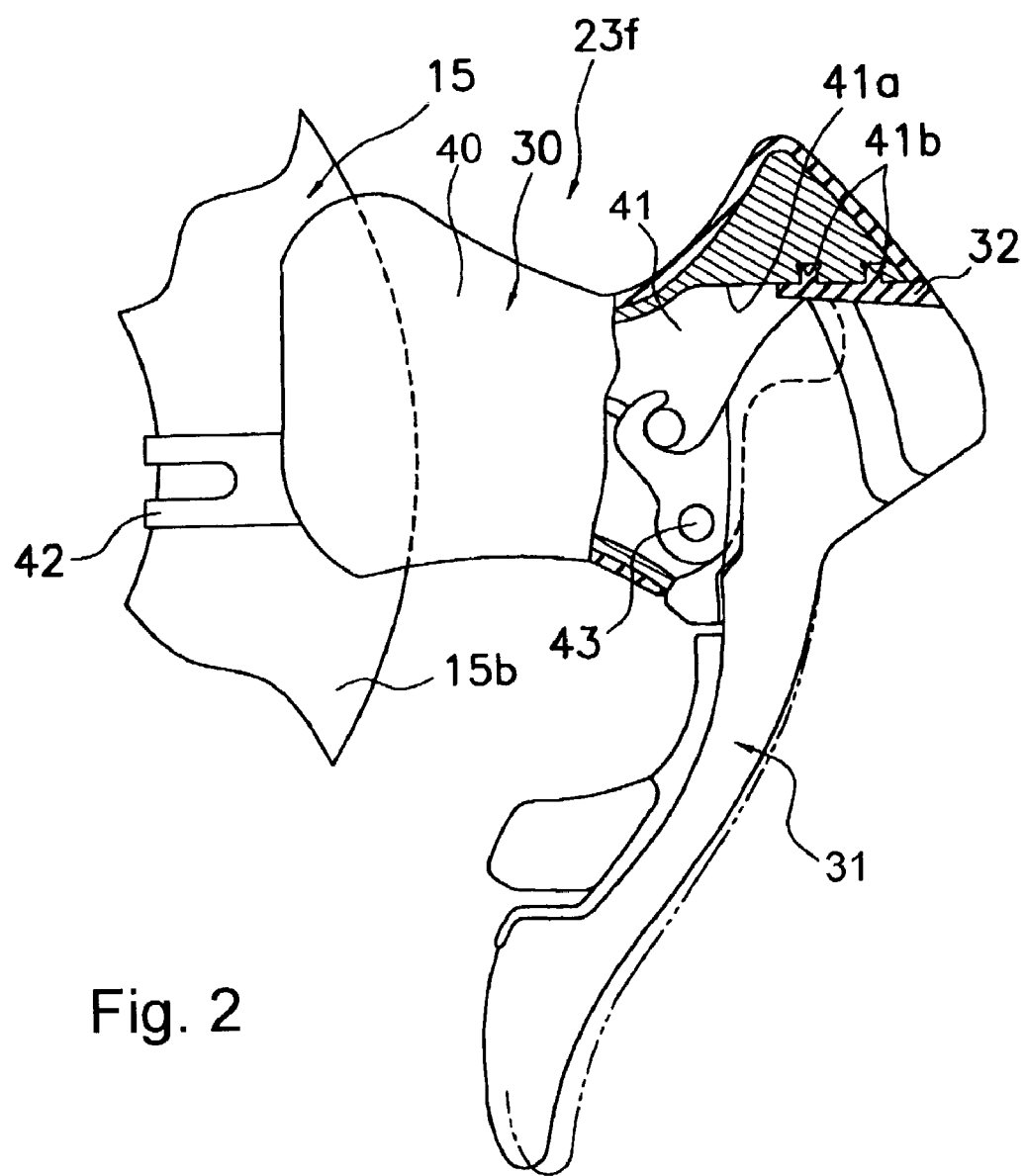
FIG. 2 is a partial side cross-sectional view of a particular embodiment of a brake control device.

FIG. 1 is a side view of a particular embodiment of a bicycle 10 that may include one or more embodiments of an adjusting apparatus for a brake control device. The general technology for this bicycle 10 is in the public domain, so a detailed description of the bicycle's constituent parts will be omitted.

The bicycle 10 is a conventional road racer-type bicycle, and it includes a bicycle frame 14 having a handlebar 15, front and rear forks 16$f$ and 16$r$, front and rear wheels 17$f$ and 17$r$, a drive apparatus 18 that includes front and rear sprockets 19$f$ and 19$r$, a chain 19$c$ front and rear derailleurs 21$f$ and 21$r$, and a brake system 12.

The handlebar 15 is a general drop-type handlebar, and has a center area 15$a$ that extends left and right in directions essentially perpendicular to the bicycle's direction of motion, as well as a pair of curved areas 15$b$ that are curved at either end of the center area 15$a$ such that the peak of each curve faces away from the front of the bicycle 10 and the ends of the curved parts face down.

The brake system 12 includes front and rear brake mechanisms 20$f$ and 20$r$ that are mounted to the front and rear forks 16$f$ and 16$r$ respectively, front and rear brake control devices 23$f$ and 23$r$ that are secured to the curved parts 15$b$ and are used to control the brake mechanisms 20$f$ and 20$r$ (only the front brake control device 23$f$ is shown in the figure), and brake wires 24$f$ and 24$r$ that connect the brake mechanisms 20$f$ and 20$r$ to the brake control devices 23$f$ and 23$r$, respectively.

The brake mechanisms 20$f$ and 20$r$ are side-pull caliper brakes that perform braking of the front and rear wheels 17$f$ and 17$r$ through the operation of the brake control devices 23$f$ and 23$r$ that are independently connected via the brake wires 24$f$ and 24$r$. The brake control devices 23$f$ and 23$r$ are used to perform manual operation of the brake mechanisms 20$f$ and 20$r$. In this embodiment, brake control devices 23$f$ and 23$r$ also perform manual gear shifting of the front and rear derailleurs 21$f$ and 21$r$. Therefore, the brake control devices 23$f$ and 23$r$ also are separately connected to the front and rear derailleurs 21$f$ and 21$r$ by gear shift cables 22$f$ and 22$r$, respectively. Because the brake control devices 23$f$ and 23r have the same construction, only the front brake control device 23f will be described below.

As shown in FIGS. 2 through 5, the brake control device 23f has a brake control member bracket 30 that can be mounted to the curved part 15b of the drop-type handlebar 15, a hand-operated brake control member in the form of a lever member 31 that is mounted to the bracket 30 such that it can move from the brake release position toward the curved part 15b of the drop-type handlebar 15, and an adjustment member 32 that is mounted between the bracket 30 and the lever member 31 Adjustment member 32 permits the brake release position of the lever member 31 to be adjusted.

The outer circumference of the bracket 30 is covered by a flexible elastic material. The bracket 30 has a mounting piece 40 and a support member 41 that is disposed on the mounting piece 40. A band 42 is coupled to the mounting piece 40 for securing the bracket 30 to the curved part 15b of the handlebar 15. A movement axis 43 that is aligned essentially parallel to the center part 15a of the handlebar 15 (to the left and right in FIG. 3) is disposed in the support member 41. The lever member 31 is movably mounted to the support member 41 for rotating around this axis 43. A flat contact surface 41a is formed at a contact area of the support member 41 that faces the lever member 31. An adjustment member locking area 37 is formed at this contact surface. In this embodiment, the adjustment member locking area 37 has two engaging concavities 37a that can lock in place the adjustment member 32. The two engaging concavities are paced apart in the longitudinal direction of the bicycle, and they are formed as round pillar-shaped concavities that widen slightly at the bottom.

Figure 3:
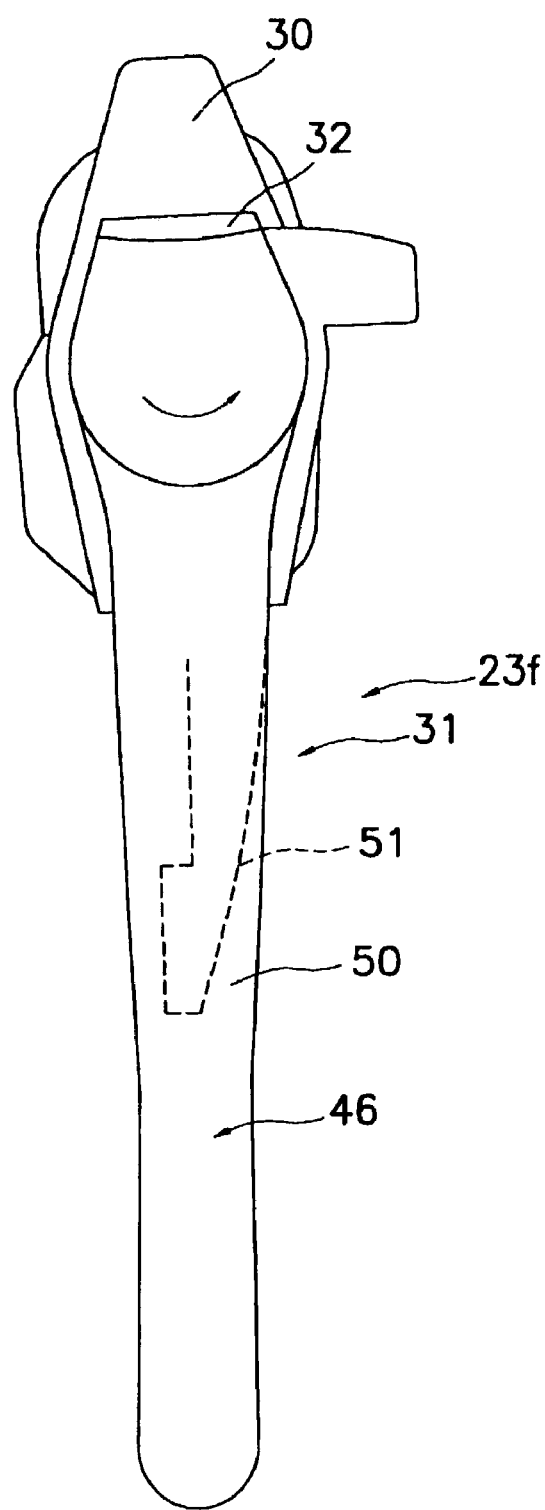
FIG. 3 is a front view of the brake control device shown in FIG. 2.
Figure 4:
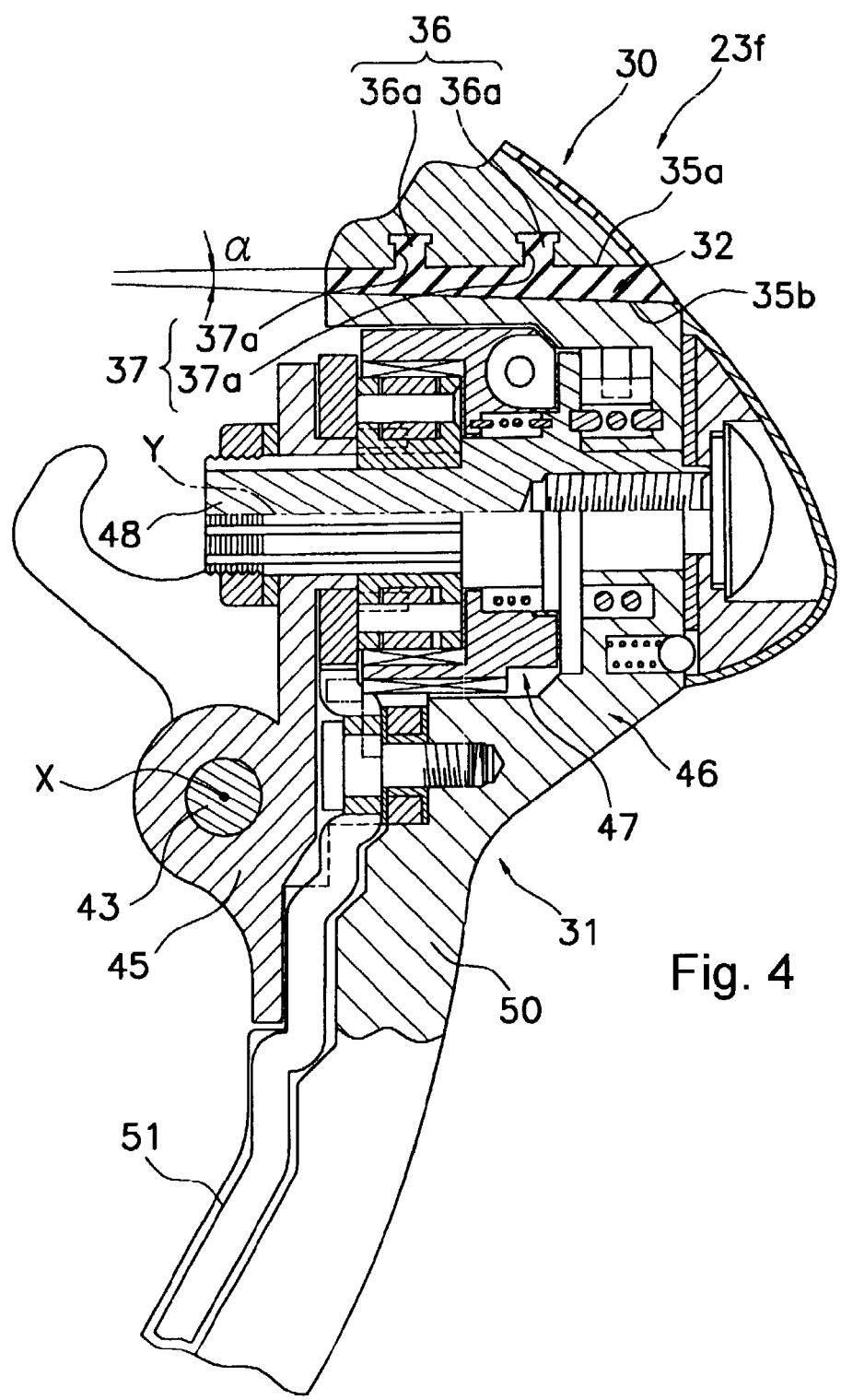
FIG. 4 is a more detailed side cross-sectional view of the brake control device shown in FIG. 2, including a particular embodiment of an adjusting apparatus.

In this embodiment, the adjustment member 32 is formed from an elastic material such as synthetic rubber, and it has a securing area 36 that is integrally formed with a member main unit 35. The member main unit 35 has a thickness that allows its insertion between the bracket 30 and the lever member 31 to cause a gap to be formed between them. As shown in FIGS. 3 and 4, the outer circumference of the member main unit 35 that is exposed to the outside has a curved and slanted surface that that it is flush with the lever member 31 and the bracket 32, taking into account the fact that the lever member 31 is moved due to the mounting of the member main unit 35. The angle α formed by the top surface 35a of the member main unit 35 that comes into contact with the contact surface 41a of the bracket 30 and the bottom surface of the member main unit 35 that comes into contact with the lever member 31 is 5°, for example. As a result, the brake release position of lever member 31 is altered 5° toward the handlebar 15 from the normal brake release position indicated by the two-dot chain line shown in FIG. 2 (the state in which the adjustment member 32 is not mounted). Consequently, the tip of lever member 31 comes to a stop at a position closer to the handlebar 15. If desired, a number of adjustment members 32 having different angles α may be provided. For example, three adjustment members 32 having angles α that vary in five-degree increments (i.e., 5°, 10°, 15°) may be provided. In any event, braking can be reliably performed even by a rider having small hands.

The securing area 36 has engaging protrusions 36a that engage and interlock with the engaging concavities 37a formed in the bracket 30. The end of each engaging protrusion 36a has a larger diameter than the rest of the protrusion, such that it widens perpendicular to the direction of the protrusion. Giving the ends a larger diameter in this fashion enables the engaging protrusions to engage with the engaging concavities 37a more easily and makes it more difficult for the adjustment member 32 to disengage from the bracket 30. Because the adjustment member 32 is secured to the bracket 30 via the engagement of such protrusions and concavities, the adjustment member 32 can be easily and reliably mounted. Also, because engaging protrusions are formed on the surface facing the lever member 31, the adjustment member 32 can be easily mounted simply by moving the lever member 31. Since the adjustment member 32 is formed from an elastic material, the impact noise when the lever 31 returns to the brake release position is minimized and the impact is absorbed.

Figure 5:
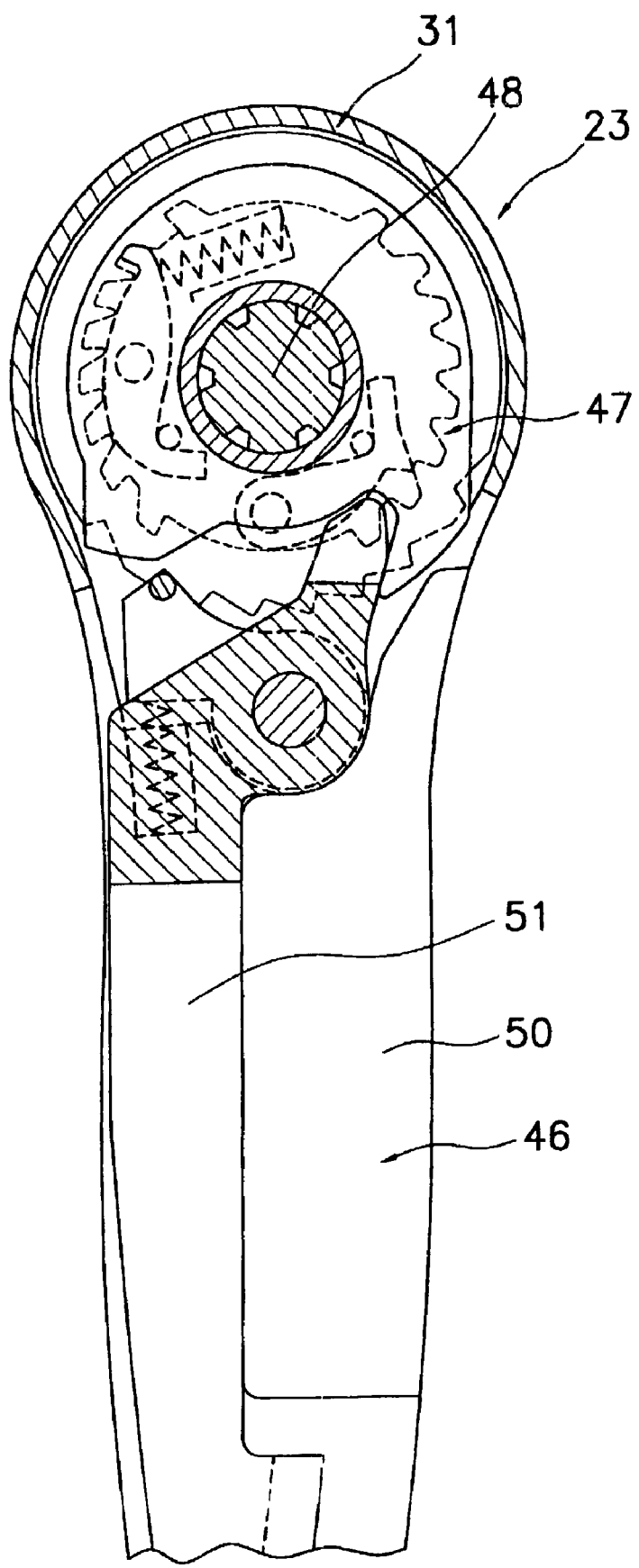
FIG. 5 is a partial side cross-sectional view of the brake control device shown in FIG. 2.

As shown in FIGS. 4 and 5, the lever member 31 has a base 45 and an operation member 46. Base 45 is movably mounted to the movement axis 43 of the bracket 30 such that it moves around a first axis X that is parallel to the center part 15a of the handlebar 15 (to the left and right in FIG. 3). Operation member 46 is movably mounted to the base 45 such that it can move around a second axis Y that is aligned generally perpendicular to the first axis X. A gear shift control device 47 is coupled to the operation member 46 so that movement of the operation member 46 around the second axis Y operates the gear shift control device 47. More specifically, a mounting shaft 48 is secured in the base 45. The mounting shaft 48 is aligned along the second axis Y, and the operation member 46 is mounted to the mounting shaft 48.

The operation member 46 has a first lever 50 and a second lever 51. First lever 50 performs braking as well as gear shifting of the derailleur 21f or 21r to a higher gear, and second lever 51 performs gear shifting of the derailleur 21f or 21r to a lower gear. These components and the construction of the gear shift control device 47 are identical to those disclosed in Japanese Laid-Open Patent Number H2-225191, for example, and the construction and operation of the operation member 46 and the gear shift control device 47 will not be described in detail here. Basically, the front brake apparatus 20f or the rear brake apparatus 20r can be braked by moving the first lever 50 of the operation member 46 around the first axis X toward the curved part 15b of the handlebar 15. This brake release position can be adjusted by mounting the adjustment member 32 such that the tip of the operation member 46 moves closer toward the curved part 15b. The gear shift control device 47 operates to upshift the derailleur 21f or 21r when the first lever 50 is moved to the inside around axis Y, i.e., in the direction indicated by the arrow in FIG. 3, and to downshift when the second lever 51 is moved around the axis Y to the inside.

Figure 6:
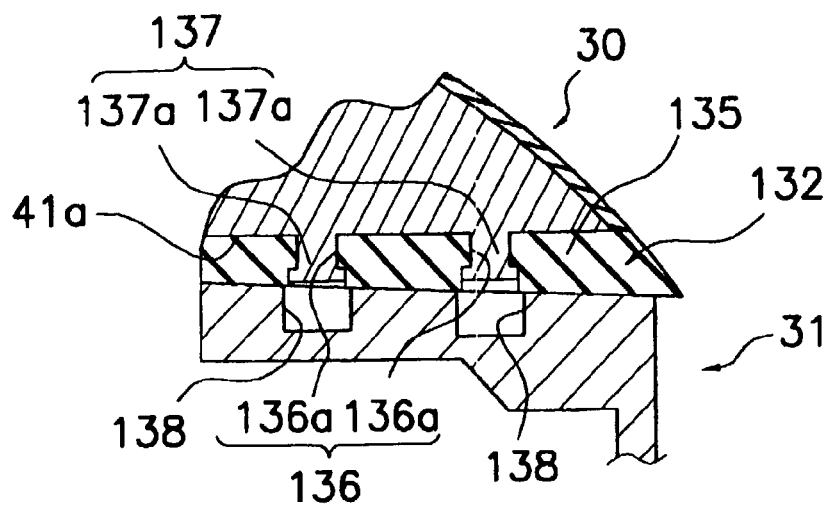
FIG. 6 is a partial cross-section of another embodiment of an adjusting apparatus.

While the above is a description of a particular embodiment having inventive features, further modifications may be employed without departing from the spirit and scope of the present invention. For example, in the above embodiment, the adjustment member locking area 37 comprising the engaging concavities 37a was disposed on the contact surface 41a of the bracket 30, and the securing area 36 comprising engaging protrusions 36a was disposed on the adjustment member 32. However, it is acceptable if an adjustment member locking area 137 comprising engaging protrusions 137a is disposed on the bracket 30 and a securing area 136 comprising engaging concavities is disposed on the adjustment member 132, as shown in FIG. 6. In FIG. 6, the engaging concavities 136a pass through the adjustment member 132. Furthermore, housing concavities 138 that prevent the engaging protrusions 137a from constituting obstructions when the brake is released are formed in the lever member 31. As a result, the engaging protrusions 137a do not come into contact with the lever member 31 when the adjustment member 132 is removed. Because the construction of the securing area 136 having engaging concavities 136a as described above eliminates the need for engaging protrusions on the member main unit 135, the construction of the member main unit 135 becomes simple.

Figure 7:
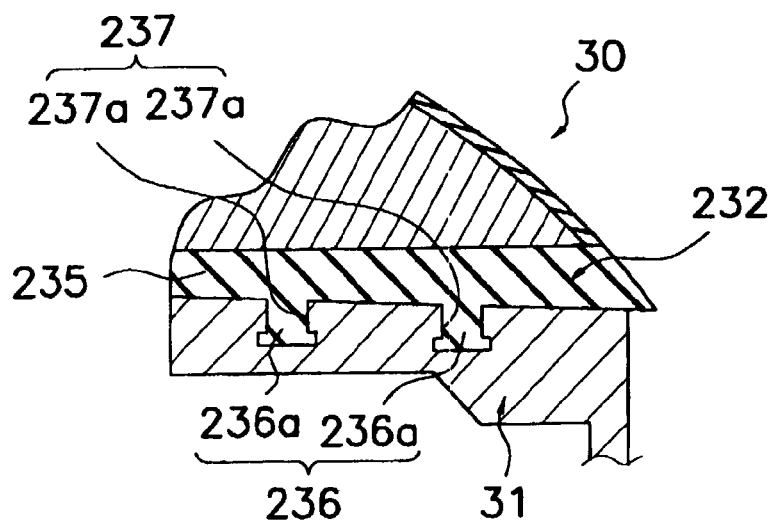
FIG. 7 is a partial cross-section of another embodiment of an adjusting apparatus.

In the first embodiment, the adjustment member 32 was mounted to the bracket 30, but it is acceptable if an adjustment member 232 is mounted to the lever member 31, as shown in FIG. 7. An adjustment member locking area 237 having a pair of engaging concavities 237a is disposed on the lever member 31 in this embodiment, and a securing area 236 having a pair of engaging protrusions 236a is disposed on the adjustment member 232. In this case, when the lever member 31 is moved toward the handlebar 15, the surface to be used for mounting the adjustment member 232 becomes exposed, thus making the adjustment member 232 easy to mount.

Figure 8:
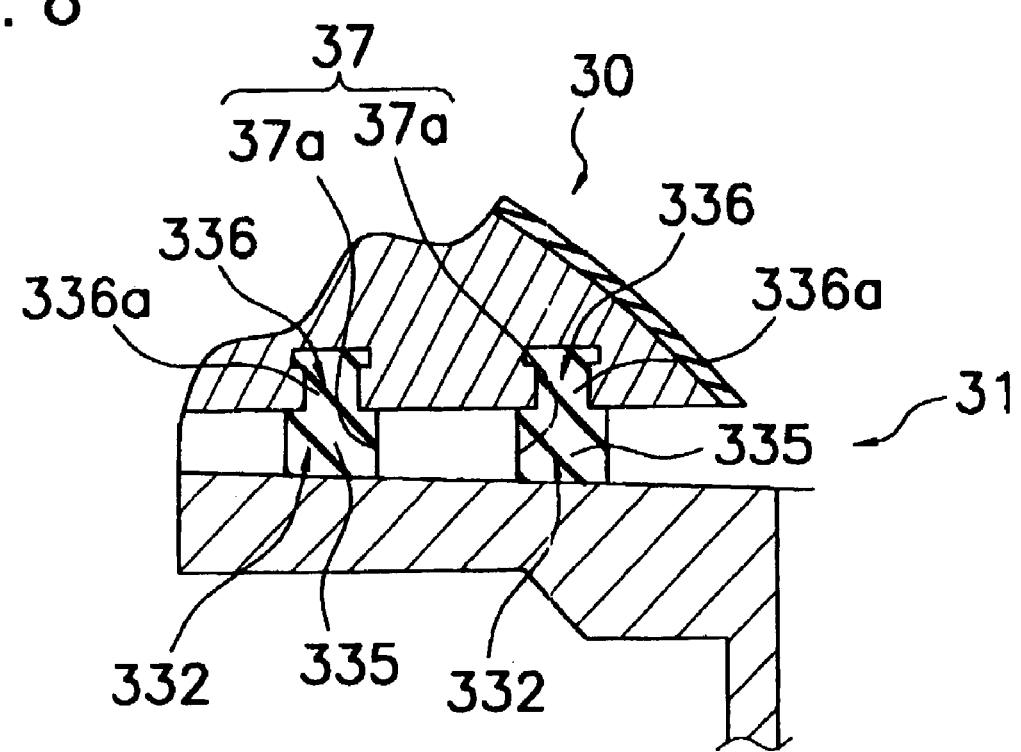
FIG. 8 is a partial cross-section of another embodiment of an adjusting apparatus.

In the various embodiments, a securing area having a pair of engaging protrusions 36a was disposed on the member main unit 35, but it is acceptable if adjustment members 332 each comprising a securing piece 336 having a member main unit 335 and an engaging protrusion 336a are respectively mounted to the pair of engaging concavities 37a, as shown in FIG. 8. In this case, in order to adjust the brake release position of the lever member 31, it may be desirable, but not necessary, that the front adjustment member 332 be thicker than the rear adjustment member 332. Moreover, an adjustment member 332 may be located only in the front concavity.

In the above embodiments, a brake control device mounted to a drop-type handlebar was disclosed, but such inventive features may be mounted to all types of bicycle handlebars, including normal straight-type and raised-type handlebars.

In the above embodiments, the adjustment member 32 was formed from an elastic material, but the material of the adjustment member 32 is not limited thereto, and a different material such as synthetic resin, cork, wood and so on may be used.

The size, shape, location or orientation of the various components may be changed as desired. Components that are shown directly connected or contacting each other may have intermediate structures disposed between them. The functions of one element may be performed by two, and vice versa. The structures and functions of one embodiment may be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus on a particular structure or feature.

What is claimed is:

1. An adjusting apparatus for a bicycle brake control device comprising:
   a brake control member bracket adapted to be mounted to a handlebar;
   a brake control member movably mounted to the brake control member bracket such that it can move from a brake release position toward a brake operating position;
   an adjustment member disposed between the brake control member bracket and the brake control member to adjust an orientation of the brake control member relative to the brake control member bracket when the brake control member is in the brake release position;
   wherein the adjustment member comprises:
   a main unit; and
   a securing area coupled to the main unit that becomes secured to one of the brake control member bracket and the brake control member forward of a location of the brake control member bracket that mounts the brake control member bracket to the handlebar and forward of a brake control wire location at a front opening that widens as the brake control member is moved toward the brake operating position.

2. The apparatus according to claim 1 wherein the adjustment member adjusts the brake control member toward the brake operating position.

3. The apparatus according to claim 2 wherein the brake control member comprises a brake control lever that is coupled to the brake control member bracket such that the brake control lever can move around a first axis from the brake release position toward the brake operating position.

4. The apparatus according to claim 3 wherein the brake control lever is coupled to the brake control member bracket such that the brake control lever moves toward the handlebar when moving from the brake release position toward the brake operating position.

5. The apparatus according to claim 4 wherein the adjustment member comprises a flexible elastic material.

6. The apparatus according to claim 4 wherein the brake control lever comprises:
   a base movably mounted to the brake control member bracket such that the base can move around the first axis;
   an operation member that is movably mounted to the base such that the operation member can move around a second axis that is different from the first axis; and
   a gear shift operation device that can perform gear shifting in tandem with the movement of the operation member around the second axis.

7. The apparatus according to claim 1 wherein the securing area includes at least one engaging protrusion that engages a corresponding engaging concavity disposed on at least one of the brake control member bracket and the brake control member.

8. The apparatus according to claim 7 wherein the engaging concavity is disposed on a surface of the at least one of the brake control member bracket and the brake control member that faces a surface of the other one of the brake control member bracket and the brake control member.

9. The apparatus according to claim 8 wherein an end of the at least one engaging protrusion has a larger diameter than the rest of the protrusion, such that it widens perpendicular to the direction of the protrusion.

10. An adjusting apparatus for a bicycle brake control device comprising:
    a brake control member bracket adapted to be mounted to a handlebar;
    a brake control member movably mounted to the brake control member bracket such that it can move from a brake release position toward a brake operating position;
    an adjustment member disposed between the brake control member bracket and the brake control member to adjust an orientation of the brake control member relative to the brake control member bracket when the brake control member is in the brake release position;
    wherein the adjustment member comprises:
    a main unit; and a securing area coupled to the main unit that becomes secured to one of the brake control member bracket and the brake control member;

wherein the securing area includes at least one engaging protrusion that engages a corresponding engaging concavity disposed on at least one of the brake control member bracket and the brake control member;

wherein the engaging concavity is disposed on a surface of the at least one of the brake control member bracket and the brake control member that faces a surface of the other one of the brake control member bracket and the brake control member; and wherein the securing area comprises a plurality of engaging protrusions that engage a corresponding plurality of engaging concavities disposed on the brake control member bracket.

11. The apparatus according to claim 10 wherein the brake control member comprises a brake control lever that is coupled to the brake control member bracket such that the brake control lever moves around a first axis toward the handlebar when moving from the brake release position toward the brake operating position.

12. The apparatus according to claim 11 wherein the adjustment member comprises a flexible elastic material.

13. The apparatus according to claim 11 wherein an end of at least one of the plurality of engaging protrusion has a larger diameter than the rest of the protrusion, such that it widens perpendicular to the direction of the protrusion.

14. The apparatus according to claim 11 wherein the brake control lever comprises:
   a base movably mounted to the brake control member bracket such that the base can move around the first axis;
   an operation member that is movably mounted to the base such that the operation member can move around a second axis that is different from the first axis; and
   a gear shift operation device that can perform gear shifting in tandem with the movement of the operation member around the second axis.

15. An adjusting apparatus for a bicycle brake control device comprising:
   a brake control member bracket adapted to be mounted to a handlebar;
   a brake control member movably mounted to the brake control member bracket such that it can move from a brake release position toward a brake operating position;
   an adjustment member disposed between the brake control member bracket and the brake control member to adjust an orientation of the brake control member relative to the brake control member bracket when the brake control member is in the brake release position;
   wherein the adjustment member comprises:
      a main unit; and
      a securing area coupled to the main unit that becomes secured to one of the brake control member bracket and the brake control member;
   wherein the securing area includes at least one engaging protrusion that engages a corresponding engaging concavity disposed on at least one of the brake control member bracket and the brake control member;
   wherein the engaging concavity is disposed on a surface of the at least one of the brake control member bracket and the brake control member that faces a surface of the other one of the brake control member bracket and the brake control member; and
   wherein the securing area comprises a plurality of engaging protrusions that engage a corresponding plurality of engaging concavities disposed on the brake control member.

16. The apparatus according to claim 15 wherein the brake control member comprises a brake control lever that is coupled to the brake control member bracket such that the brake control lever moves around a first axis toward the handlebar when moving from the brake release position toward the brake operating position.

17. The apparatus according to claim 16 wherein the adjustment member comprises a flexible elastic material.

18. The apparatus according to claim 16 wherein an end of at least one of the plurality of engaging protrusions has a larger diameter than the rest of the protrusion, such that it widens perpendicular to the direction of the protrusion.

19. The apparatus according to claim 16 wherein the brake control lever comprises:
   a base movably mounted to the brake control member bracket such that the base can move around the first axis;
   an operation member that is movably mounted to the base such that the operation member can move around a second axis that is different from the first axis; and
   a gear shift operation device that can perform gear shifting in tandem with the movement of the operation member around the second axis.

20. An adjusting apparatus for a bicycle brake control device comprising:
   a brake control member bracket adapted to be mounted to a handlebar;
   a brake control member movably mounted to the brake control member bracket such that it can move from a brake release position toward a brake operating position;
   an adjustment member disposed between the brake control member bracket and the brake control member to adjust an orientation of the brake control member relative to the brake control member bracket when the brake control member is in the brake release position;
   wherein the adjustment member comprises:
      a main unit; and
      a securing area coupled to the main unit that becomes secured to one of the brake control member bracket and the brake control member;
   wherein the securing area includes at least one engaging protrusion that engages a corresponding engaging concavity disposed on at least one of the brake control member bracket and the brake control member;
   wherein the engaging concavity is disposed on a surface of the at least one of the brake control member bracket and the brake control member that faces a surface of the other one of the brake control member bracket and the brake control member; and
   wherein the securing area comprises only one engaging protrusion coupled to the main unit.

21. An adjusting apparatus for a bicycle brake control device comprising:
   a brake control member bracket adapted to be mounted to a handlebar;
   a brake control member movably mounted to the brake control member bracket such that it can move from a brake release position toward a brake operating position;
   an adjustment member disposed between the brake control member bracket and the brake control member to adjust an orientation of the brake control member relative to the brake control member bracket when the brake control member is in the brake release position;

wherein the adjustment member comprises:
  a main unit; and
  a securing area coupled to the main unit that becomes secured to one of the brake control member bracket and the brake control member;

wherein the securing area includes at least one engaging protrusion that engages a corresponding engaging concavity disposed on at least one of the brake control member bracket and the brake control member;

wherein the engaging concavity is disposed on a surface of the at least one of the brake control member bracket and the brake control member that faces a surface of the other one of the brake control member bracket and the brake control member; and wherein the securing area comprises a plurality of engaging protrusions, each of which corresponds to only one main unit.

22. An adjusting apparatus for a bicycle brake control device comprising:
  a brake control member bracket adapted to be mounted to a handlebar;
  a brake control member movably mounted to the brake control member bracket such that it can move from a brake release position toward a brake operating position;
  an adjustment member disposed between the brake control member bracket and the brake control member to adjust an orientation of the brake control member relative to the brake control member bracket when the brake control member is in the brake release position;
  wherein the adjustment member comprises:
    a main unit; and
    a securing area coupled to the main unit that becomes secured to one of the brake control member bracket and the brake control member; and
  wherein the securing area includes at least one engaging concavity that engages a corresponding engaging protrusion disposed on one of the brake control member bracket and the brake control member.

23. The apparatus according to claim 22 wherein the other one of the brake control member bracket and the brake control member includes an engaging concavity that faces the engaging protrusion.

24. An adjusting apparatus for a bicycle brake control device comprising:
  a brake control member bracket adapted to be mounted to a handlebar;
  a brake control member movably mounted to the brake control member bracket such that it can move from a brake release position toward a brake operating position;
  an adjustment member disposed between the brake control member bracket and the brake control member to adjust an orientation of the brake control member relative to the brake control member bracket when the brake control member is in the brake release position;
  wherein the adjustment member comprises:
    a main unit; and
    a securing area coupled to the main unit that becomes secured to one of the brake control member bracket and the brake control member; and
  wherein the securing area includes a plurality of engaging concavities that engage a corresponding plurality of engaging protrusions disposed on one of the brake control member bracket and the brake control member.

25. The apparatus according to claim 24 wherein the brake control member comprises a brake control lever that is coupled to the brake control member bracket such that the brake control lever moves around a first axis toward the handlebar when moving from the brake release position toward the brake operating position.

26. The apparatus according to claim 25 wherein the adjustment member comprises a flexible elastic material.

27. The apparatus according to claim 25 wherein an end of at least one of the plurality of engaging protrusion has a larger diameter than the rest of the protrusion, such that it widens perpendicular to the direction of the protrusion.

28. The apparatus according to claim 25 wherein the brake control lever comprises:
  a base movably mounted to the brake control member bracket such that the base can move around the first axis;
  an operation member that is movably mounted to the base such that the operation member can move around a second axis that is different from the first axis; and
  a gear shift operation device that can perform gear shifting in tandem with the movement of the operation member around the second axis.

29. The apparatus according to claim 25 wherein the other one of the brake control member bracket and the brake control member includes a plurality of engaging concavities that face corresponding ones of the plurality of the engaging protrusions.

* * * * *